UNITED STATES PATENT OFFICE.

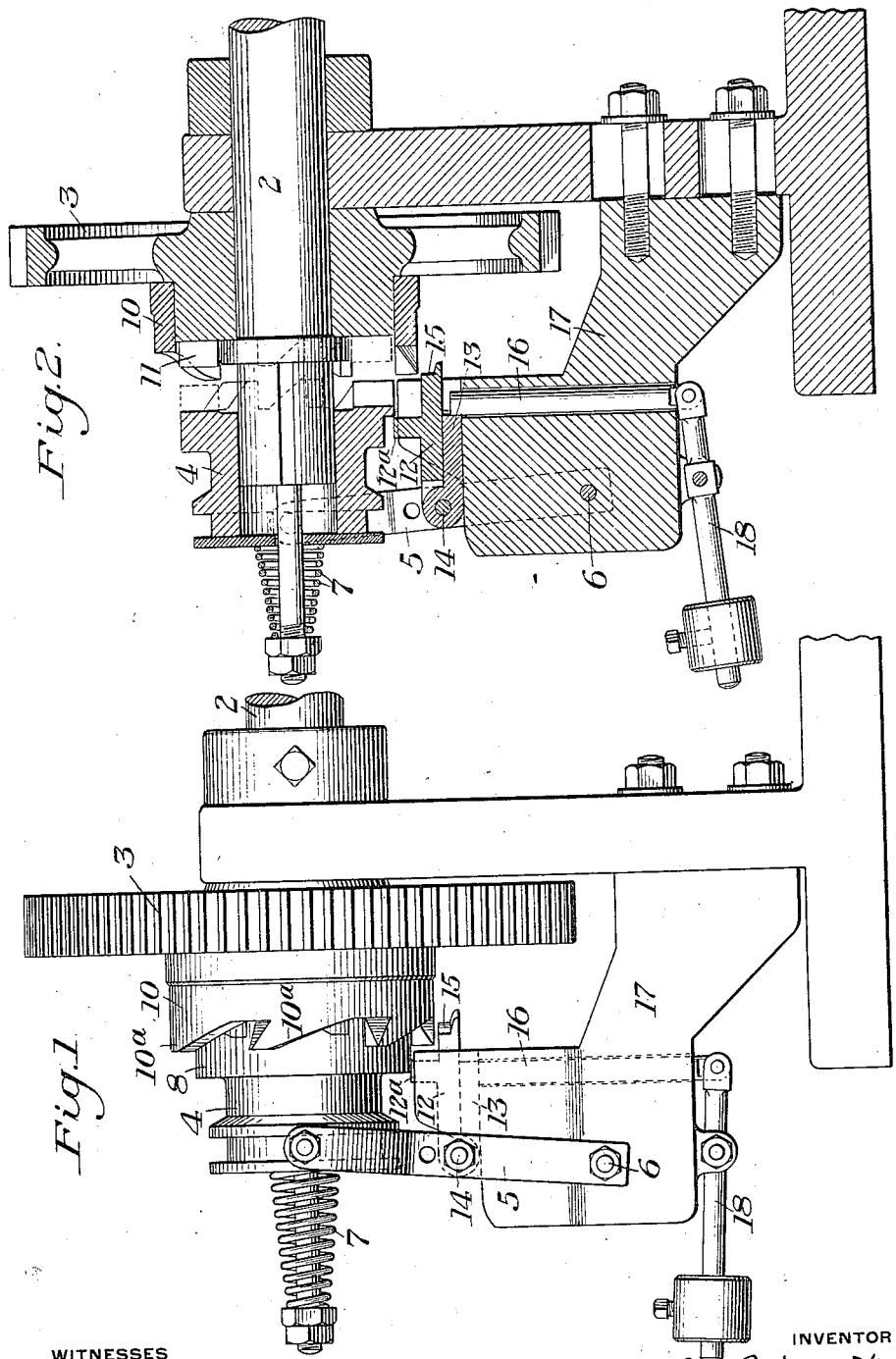

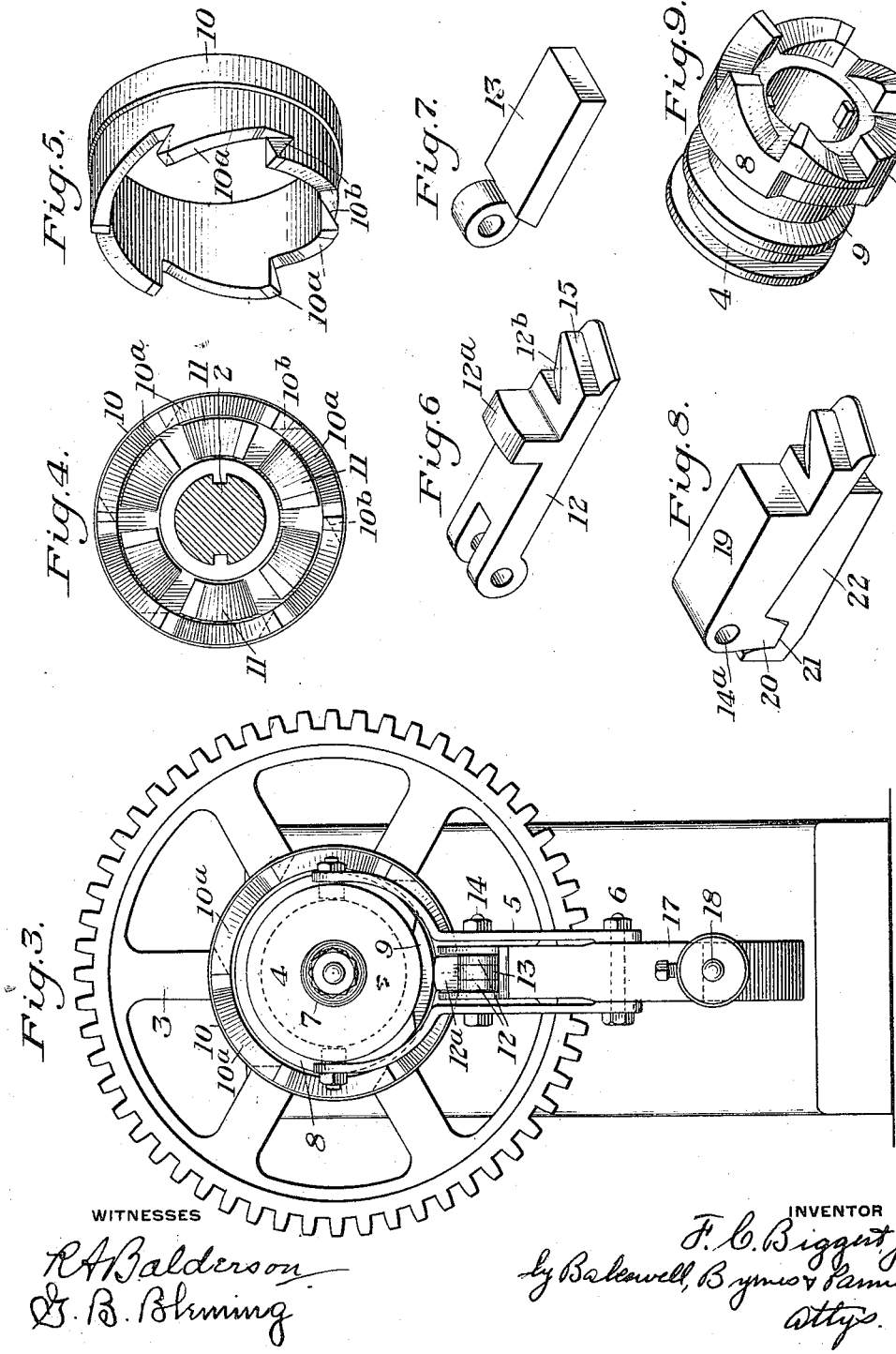

FLORENCE C. BIGGERT, JR., OF PITTSBURGH, PENNSYLVANIA.

CLUTCH.

1,265,595.          Specification of Letters Patent.          Patented May 7, 1918.

Application filed August 14, 1917.   Serial No. 186,213.

*To all whom it may concern:*

Be it known that I, FLORENCE C. BIGGERT, Jr., a citizen of the United States, residing at Pittsburgh, in the county of Allegheny and State of Pennsylvania, have invented a new and useful Improvement in Clutches, of which the following is a full, clear, and exact description, reference being had to the accompanying drawings, forming part of this specification, in which—

Figure 1 is a side elevation of a clutch embodying my invention, with the clutch members in engagement.

Fig. 2 is a vertical section with the clutch members separated.

Fig. 3 is an end elevation;

Figs. 4 and 5 are detail views of the cams;

Figs. 6 and 7 are perspective detail views of the dogs;

Fig. 8 is a perspective view showing a modified form of the dogs; and

Fig. 9 is a perspective view of the clutch member.

My invention has relation to clutches and more particularly to clutches of that type which are required to automatically disengage after each complete or partial revolution of the driven shaft. Clutches of this character are of wide application in the various arts.

One object of my invention is to provide a clutch of this type in which the clutch teeth or jaws upon disengagment may be separated to a greater extent than has heretofore been possible, and to such an extent as to be entirely out of contact with each other.

A further object of my invention is to provide a clutch of this type which is simple in its construction and mode of operation and which contains but few parts and those of a character not likely to get out of order.

A further object is to provide a clutch-disengaging cam in which the wear is distributed over a plurality of cam surfaces.

A still further object is to permit the driven shaft to be rotated by hand or otherwise when the clutch is disengaged without causing the clutch to engage.

The nature of my invention will be best understood by reference to the accompanying drawings in which I have shown the preferred embodiment thereof and which will now be described, it being premised, however, that various changes can be made in the details of construction, arrangement and combination of the several parts, without departing from the spirit and scope of my invention as defined in the appended claims.

In these drawings, the numeral 2 designates a driven shaft and 3 the driving wheel therefor, said wheel being loosely mounted on the shaft and adapted to be connected to and disconnected from the shaft by the operation of my improved clutch.

The numeral 4 designates the shiftable clutch member, which is rotatable with the shaft 2, but is slidable endwise thereon. 5 is a shifting lever pivoted at 6 and engaging the clutch member 4. 7 is a spring which normally tends to hold the clutch in engagement.

The clutch member 4 is provided with the peripheral cam portion 8, having at one side the recess 9, which determines the point at which the clutch will disengage. If the shaft 2 is to make a complete revolution before disengagement of the clutch, but one of these recesses will be provided. If the clutch is to make more than one disengagement for each revolution of the shaft 2, two or more of these recesses can be provided in said cam portion. 10 is a shifting cam which, instead of being carried by the clutch member 4, as is usual in this type of clutch, is carried by the driving wheel 3. This cam 10 is provided with as many cam projections $10^a$ as there are teeth or jaws on the clutch member 4, the wheel 3 having coöperating clutch teeth or jaws 11.

Pivoted in the shifting lever 5 is a compound dog consisting of an upper member 12 and a lower member 13, both members being hinged on the same pivot 14. The upper dog member 12 is longer than the lower member 13, and has the shouldered extension 15 for engagement with the cam projections $10^a$. 16 is a holding pin working in a suitable guide aperture in the bracket 17, to which the shifting lever is pivoted and which is connected at its lower end to a counterweighted bar or lever 18.

The extension 15 of the upper dog member is provided with an inclined face $12^b$, while the cam teeth $10^a$ are provided with inclined faces $10^b$ to be engaged by the face $12^b$ when the clutch is to be disengaged. These inclined faces permit the dog 12 to swing into operative position while the tooth $10^a$ preceding the operating tooth 10ᵃ is passing this dog 12, when the recess 9 is over the point 12ᵃ of the dog 12.

This inclining of these faces permits the dog member 12 to move into operative position without the loss of any of the length of the cam faces of the cam projections 10ᵃ and without the loss of any of the working faces of the cams or the dog member.

By the provision of these inclined surfaces I am also enabled to rotate the wheel 3 in the reverse direction without wrecking the machine, as the projections 10ᵃ will readily pass the dog member 12 when the wheel is reversed.

The operation is as follows: When the teeth of the clutch member 4 are in driving engagement with the clutch teeth 11 of the wheel 3, the unrecessed peripheral portion of the cam 8 is in contact with the upper dog member 12, at the point 12ᵃ, thereby holding said member down against the action of the counterweighted bar or lever 18, and the extension 15 being thus held below and out of the path of movement of the cam projections 10ᵃ. When the point in the revolution is reached at which the recess 9 comes opposite the surface 12ᵃ of the dog 12, the latter is moved upwardly by the action of the weighted bar or lever 18, thereby raising the extension 15 into the plane of movement of the cam projections 10ᵃ, and the next succeeding cam projection 10ᵃ will engage said extension 15, thereby forcing the clutch member 4 out of engagement with and away from the clutch teeth on the wheel 3. This also moves the dogs backwardly until the lower dog member 13 drops behind the upper end of the pin 16. This locks the clutch in disengaged position, where it remains locked until the weighted lever is manually tripped, and when the cam projection 10ᵃ passes the extension 15 of dog 12, said dog moves by gravity out of the path of the succeeding cams.

When the weighted bar or lever is again tripped, the spring 7 immediately restores the parts to their normal engaging positions.

In Fig. 8, I have shown a modified form of a compound dog which it may be desirable to use in some instances, especially where gravity cannot be fully relied upon to return the dogs to their normal positions after operation. In this form of my invention, the upper dog member 19 is pivoted on the pin at 14ᵃ and is provided with a heel portion 20, engaging a recess 21 in the lower dog member 22, this heel acting as a lever arm. When the clutch is disengaged the pressure of the spring 7 will be transmitted through the shifting lever 5 to dog 19 and thence by the heel of said dog to dog 22 but as the heel of dog 19 forms a lever with the pivot the dog 19 will be strongly forced against dog 22 thus insuring its clearing the cams. If the dogs work in such a position that gravity cannot be depended upon to cause dog 22 to assume its locking position a suitable spring may be interposed between the dogs.

The advantages of my invention will be apparent to those familiar with clutches of this type. Heretofore, in clutches in which the shifting cam has been carried by the driven member, the latter stops as soon as the clutch teeth or jaws disengage and cannot be further separated so that the teeth are usually left in a position where there is more or less rubbing contact between them as the driving member continues to revolve. This soon results in a very considerable amount of wear, causing chattering of the clutch and sometimes its failure to operate. By placing the shifting cam upon the driving member, I am able to cause the entire separation of the clutch faces to such an extent that it is impossible for such wear to occur.

By inclining the faces of the upper dog member and the cams, the dog is permitted to move into operative position by the time the cam for shifting the dog reaches it, so that the entire length of the cam faces can be utilized for shifting the dog, and this construction also provides means for reversing the mechanism without danger of wrecking the machine.

Another place of great wear on clutches of this type is on the points or acting faces of the shifting cam. In accordance with my invention, this wear is distributed among a plurality of cam projections, thereby greatly reducing the wear at any particular point. For instance, if there are six teeth on the clutch, my shifting cam will be provided with six cam projections, and in operation, the wear will be distributed with a fair degree of uniformity among these six projections.

The entire clutch is simple in construction. There are but few parts, which are positive in their operation, and not likely to get out of order.

I claim:

1. In an automatic clutch, the combination with a driven member and a driving member, of a movable clutch member carried by the driven member and adapted to be moved into and out of clutching engagement with the driving member, a clutch shifting cam carried by the driving member, and means operated by the driven member for determining the time of action of said cam and for then causing the cam to operate to disengage the clutch, substantially as described.

2. In an automatic clutch, the combination with a driving member and a driven member, of a clutch member mounted on the driven member to rotate therewith and also to move longitudinally thereon into and out of engagement with the driving member, a shifting lever engaging said clutch member, a shifting cam carried by the driving member, a dog adapted to be engaged by said cam, another cam carried by the driven member for controlling said dog, and means for holding the clutch member disengaged, substantially as described.

3. In an automatic clutch, the combination with a driving member and a driven member, of a shiftable clutch member carried by the driven member and movable into and out of engagement with the driving member, a shifting cam carried by the driving member and having as many cam projections thereon as there are teeth or jaws on the clutch member, a shifting lever engaging said clutch member, and a spring normally acting on the shifting lever, a cam on the clutch member for controlling said dog, and means for holding the clutch member in disengaged position, substantially as described.

4. In an automatic clutch, the combination with a driven member and a driving member, of a clutch member mounted on the driven member and movable into and out of clutching engagement with the driving member, a shifting cam carried by the driving member, a shifting lever engaging the clutch member, a dog carried by the shifting lever and adapted for engagement with the cam carried by the driving member, another cam carried by the driven member for controlling said dog, and locking means for said dog, substantially as described.

5. In an automatic clutch, the combination with a driven member and a driving member, of a clutch member mounted on the driven member for movement into and out of clutching engagement with the driving member, a shifting lever, a cam carried by the driving member, a dog carried by the shifting lever, a cam carried by the driven member and arranged to engage and control the said dog, and a weighted locking pin coöperating with said dog, substantially as described.

6. In an automatic clutch, the combination with a driven member and a driving member, of a clutch member mounted on the driven member for movement into and out of clutching engagement with the driving member, a shifting lever, a cam carried by the driving member, a dog carried by the shifting lever, a cam carried by the driven member and arranged to engage and control the said dog, and a weighted locking pin coöperating with said dog, said dog comprising two members, one of which is adapted to be engaged by the shifting cam and the other of which is arranged to be engaged by said locking pin, substantially as described.

7. In an automatic clutch, the combination with a driving member, and a driven member, of a shiftable clutch member carried by one of the first mentioned members and movable into and out of engagement with the other member, a shift cam, and a clutch shifting dog arranged to be actuated by the cam, there being inclined faces on the dog and the cam arranged to permit the dog to move into operative position in front of the cam, substantially as described.

8. In an automatic clutch, the combination with a driving member and a driven member, each of said members having a clutch element of the tooth or jaw type, and arranged to engage and disengage by relative movement in the direction of the axis of said members, a clutch-shifting cam carried by the driving member, and a timing device for controlling the time of operation of the clutch-shifting cam and carried by the driven member, substantially as described.

In testimony whereof, I have hereunto set my hand.

FLORENCE C. BIGGERT, Jr.

Copies of this patent may be obtained for five cents each, by addressing the "Commissioner of Patents, Washington, D. C."